United States Patent
Ackerman et al.

(10) Patent No.: US 6,945,385 B2
(45) Date of Patent: Sep. 20, 2005

(54) SQUARE BALE FEEDER ATTACHMENT FOR FLAT-BED VEHICLES

(75) Inventors: Galen R. Ackerman, Sabetha, KS (US); Randy L. Broxterman, Sabetha, KS (US); Cedric C. Heiniger, Sabetha, KS (US); K. Russell Harrell, Sabetha, KS (US); Kerry S. Broxterman, Hiawatha, KS (US)

(73) Assignee: Triple C Manufacturing, Inc., Sabetha, KS (US)

( * ) Notice: Subject to any disclaimer, the term of this patent is extended or adjusted under 35 U.S.C. 154(b) by 0 days.

(21) Appl. No.: 10/862,680

(22) Filed: Jun. 7, 2004

(65) Prior Publication Data

US 2004/0218999 A1 Nov. 4, 2004

Related U.S. Application Data

(62) Division of application No. 10/225,816, filed on Aug. 21, 2002.

(51) Int. Cl.[7] ............................................. B65G 13/02
(52) U.S. Cl. ................................... 198/692; 198/468.2
(58) Field of Search ............................... 414/503, 504, 414/505, 555, 24.5, 25, 24.6; 198/468.2, 692

(56) References Cited

U.S. PATENT DOCUMENTS

| | | | |
|---|---|---|---|
| 675,703 A | * | 6/1901 | Allen .......................... 198/692 |
| 2,627,159 A | * | 2/1953 | Russell ........................ 56/364 |
| 3,499,552 A | * | 3/1970 | Beyer et al. ............. 414/789.4 |
| 3,656,638 A | * | 4/1972 | Hutton et al. ............... 414/518 |
| 3,790,013 A | | 2/1974 | Smith |
| 3,807,579 A | | 4/1974 | Havens |
| 3,854,609 A | | 12/1974 | Cox |
| 3,863,850 A | | 2/1975 | Freeman |
| 3,870,166 A | | 3/1975 | Tull, III |
| 3,873,032 A | | 3/1975 | Jellis, Jr. |
| 3,915,392 A | | 10/1975 | Kugler |
| 3,942,666 A | | 3/1976 | Pfremmer |
| 3,979,074 A | | 9/1976 | White et al. |
| 4,034,920 A | | 7/1977 | Bradley |
| 4,052,011 A | | 10/1977 | Burkhart et al. |
| 4,073,532 A | | 2/1978 | Blair |
| 4,101,081 A | * | 7/1978 | Ritter et al. ........... 241/101.74 |
| 4,170,426 A | | 10/1979 | White et al. |
| 4,261,677 A | * | 4/1981 | Hirahara et al. ......... 414/789.3 |
| 4,264,252 A | | 4/1981 | Jennings et al. |
| 4,273,488 A | | 6/1981 | Hill et al. |
| 4,289,435 A | | 9/1981 | Boirin et al. |
| 4,310,275 A | | 1/1982 | Hoelscher |
| 4,363,583 A | | 12/1982 | Bontrager |
| 4,385,862 A | | 5/1983 | McVaugh |
| 4,457,434 A | * | 7/1984 | Brown et al. ............... 209/539 |
| 4,548,535 A | | 10/1985 | van Die |

(Continued)

OTHER PUBLICATIONS

Hay Flak'r Sales Literature.

*Primary Examiner*—Joe Dillon, Jr.
(74) *Attorney, Agent, or Firm*—Hovey Williams LLP (57) ABSTRACT

A preferred embodiment of a bed assembly for flat bed trucks has a square bale retriever at the rear of the flat bed that includes a pair of lift arms adapted to grasp a bale by its opposite ends and lift it up off the ground and onto a transverse feeder located at the front of the bed. Once deposited on the feeder, a pusher engages one end of the bale and pushes the bale along the feeder to progressively advance successive flakes of the bale into a discharging position off the remote end of the feeder. The bale can thus be progressively distributed one flake at a time, the frequency of flake discharge being controlled by the operator in the cab of the truck. Alternative embodiments for pushers for engaging and advancing the bale toward the discharge point are disclosed. The feeder may be utilized separate from the bed assembly and includes a ramp that causes the bale to move up an incline during feeding operations.

6 Claims, 9 Drawing Sheets

U.S. PATENT DOCUMENTS

| | | | |
|---|---|---|---|
| 4,560,317 A | | 12/1985 | Kellett |
| 4,564,325 A | | 1/1986 | Ackerman |
| 4,630,986 A | | 12/1986 | Taylor |
| 4,687,402 A | | 8/1987 | Zatylny |
| 4,753,338 A | * | 6/1988 | Ketonen .................... 198/692 |
| 4,789,289 A | | 12/1988 | Wilson |
| 4,911,491 A | | 3/1990 | Naaktgeboren |
| 4,925,000 A | | 5/1990 | Pacakova et al. |
| 4,934,687 A | * | 6/1990 | Hayden et al. ............ 271/202 |
| 4,943,198 A | | 7/1990 | McCabe |
| 4,952,111 A | | 8/1990 | Callahan |
| 4,971,504 A | | 11/1990 | Klomplen |
| 5,217,106 A | * | 6/1993 | Bunney .................... 198/463.5 |
| 5,556,253 A | | 9/1996 | Rozendaal et al. |
| 5,690,461 A | | 11/1997 | Tilley |
| 5,813,814 A | | 9/1998 | Smart |
| 5,829,940 A | | 11/1998 | Mahaney |
| 5,865,589 A | | 2/1999 | Reyher et al. |
| 5,873,615 A | | 2/1999 | McCullough |
| 5,975,824 A | * | 11/1999 | Hostetler .................. 414/24.5 |
| 5,984,217 A | | 11/1999 | Commins |
| 5,997,233 A | * | 12/1999 | Whatley et al. .............. 414/25 |
| 6,074,160 A | | 6/2000 | Brumbaugh et al. |
| 6,079,926 A | | 6/2000 | Cox et al. |
| 6,089,810 A | | 7/2000 | Heinz et al. |
| 6,099,228 A | | 8/2000 | Krogmann |
| 6,116,838 A | * | 9/2000 | Whatley et al. .............. 414/25 |
| 6,328,520 B1 | | 12/2001 | Maclay |
| 6,685,120 B2 | | 2/2004 | Grellner |
| 6,695,560 B2 | | 2/2004 | Maclay |

* cited by examiner

SQUARE BALE FEEDER ATTACHMENT FOR FLAT-BED VEHICLES

RELATED APPLICATION

This is a division of prior co-pending application Ser. No. 10/225,816 filed Aug. 21, 2002.

TECHNICAL FIELD

The present invention relates to agricultural equipment and, more particularly, to apparatus for handling and feeding bales of hay to livestock, especially large square bales that comprise a series of rectangular flakes of compacted crop materials.

BACKGROUND AND SUMMARY

Prior U.S. Pat. No. 4,564,325 owned by the assignee of the present invention is directed to a self-loading bed assembly for flat-bed trucks to adapt the truck to pick-up, transport, and then feed or off-load one or more big round bales. The actuating mechanism for the bale lifting arms of the device is located underneath the bed, and the lift arms are designed to slip down into recesses in the bed when the arms are in a stored position so that the arms are substantially flush with the top surface of the bed. This leaves the bed unobstructed by the device and permits the bed to be used for all kinds of other projects.

Large square bales have become progressively more attractive to small farmers and ranchers in recent years for feeding to their livestock. However, it is economically unsound for many small farmers and ranchers to obtain single-purpose equipment devoted exclusively to handling and feeding large square bales. Therefore, many have resorted to loading one or more of the bales onto the bed of a flat bed truck and then feeding the bales by hand in the field, tearing the bales apart flake-by-flake and throwing them to the ground as another person drives the vehicle. Feeding from a truck that can also be used for many other purposes obviously has economic advantages for the small farmer and rancher, but it is difficult for one person to do the job effectively.

In one embodiment, the present invention comprises an extension of the highly successful bale handling bed concepts disclosed and claimed in U.S. Pat. 4,564,325. While the bed assembly of that patent was initially intended to have primary utility for round bales, it has now been discovered that many of its concepts are applicable to square bales as well. With certain modifications, the assembly can be adapted to permit the user to retrieve, transport and feed square bales, one flake at a time, without leaving the cab of the truck, except for cutting the twines that bind the bale. At the same time, the modified bed can still be used for the retrieval, feeding, and transport of round bales. When not feeding or transporting bales, the largely exposed and unobstructed bed leaves the truck available for a myriad of other uses around the ranch or farm.

In one embodiment of the invention, a square bale feeding bed assembly has a transverse feeder at the front end of the bed within the reach of the bale lift arms. Thus, the lift arms that swing down from the back end of the bed to retrieve a bale can be used to lift a square bale from the ground and deposit it on the feeder for transport to the feeding site. At the feeding site, the feeder is periodically engaged to advance the square bale endwise toward one side of the bed, at which point the individual flakes of the bale successively fall off the feeder and onto the ground. Discharge of the flakes is aided by the use of a discharge station on the feeder that is at the receiving end of a conveyor for the bale and by a special separator associated with that station that underlies each flake as it is presented to the station and engages the bottom of the flake and projects it outwardly off the feeder for gravitation to the ground. Feeding is also aided by the fact that the feeder incorporates a ramp that is normally raised into an upwardly inclined operating position for feeding purposes such that the bale is advanced slightly up hill as it moves toward the discharge end of the feeder. This arrangement is particularly beneficial in preventing more than one flake from feeding at a time.

The feeder can be retro-fitted onto existing bed assemblies already in the field and constructed in accordance with the teachings of the '325 patent. Alternatively, the feeder may comprise part of a completely new bed assembly that may or may not utilize lift arms that are flush-mounted as contemplated by the '325 patent. Further, the feeder may be loaded by external means not part of the bed assembly, and may be positioned in a variety of orientations for feeding in different directions. Additionally, the feeder has utility totally separate and apart from mobile vehicles and may be used at stationary sites, or on wagons and the like.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Apparatus for handling and feeding big square bales in accordance with the present invention broadly includes a flat-bed vehicle 10 and a bale handling and feeding bed assembly 12 mounted on the chassis of vehicle 10. In many respect, bed assembly 12 corresponds closely to the bed assembly as disclosed and claimed in U.S. Pat. No. 4,564,325, the disclosure of which is hereby incorporated by reference into the present specification. Accordingly, reference may be had to the '325 patent for a complete understanding of the nature and operation of lift arms 14 and 16 of a bale retriever 18 forming a part of bed assembly 12, and for a full and complete understanding of the operating mechanism for lift arms 14 and 16.

Figure 2:
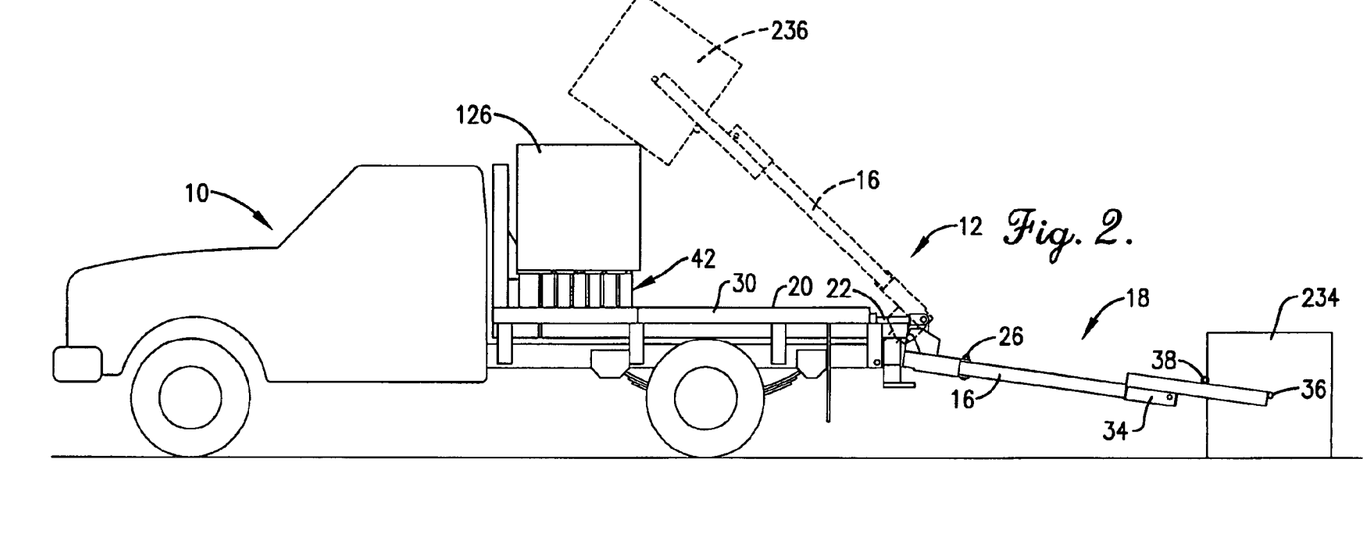
FIG. 2 is a side elevational view similar to FIG. 1 but illustrating the manner of use of the invention.

Suffice it to say, therefore, that lift arms 14 and 16 are secured to the rear end of bed 20 of bed assembly 12 for conjoint swinging movement in a generally fore-and-aft direction as illustrated, for example, in FIG. 2. Arms 14 and 16 are thus swingable about a transverse axis across the rear end of bed 20. A lift cylinder 22 shown only in FIG. 2 is operably coupled with arms 14 and 16 for carrying out this function. Mechanism not shown is also provided to move arms 14 and 16 toward and away from one another, preferably but not necessarily in a swinging motion about respective pivots 24 and 26 (FIG. 3) so that arms 14 and 16 can be used to grasp an object such as a large square bale and apply a squeezing action thereto as the arms are then swung vertically between their various positions.

Figure 1:
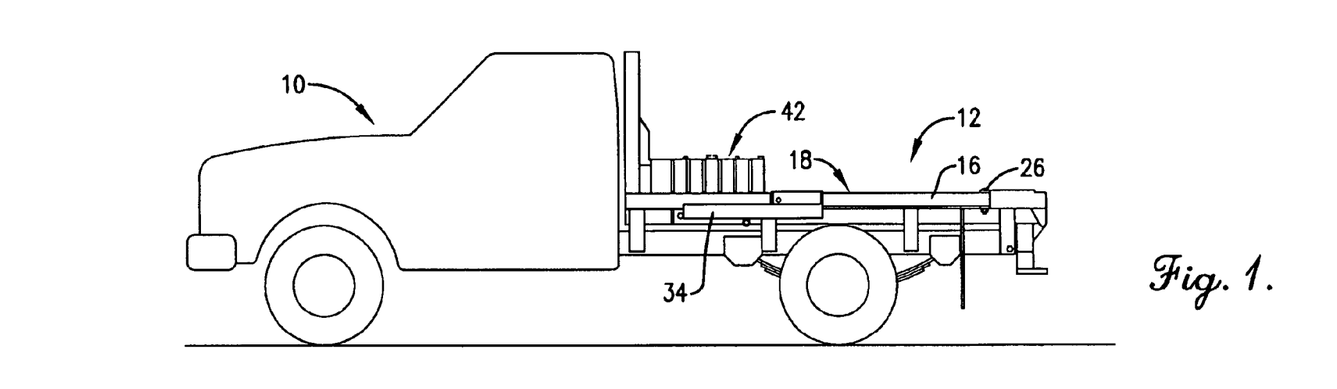
FIG. 1 is a side elevational of a flat-bed vehicle incorporating the principles of the present invention.
Figure 3:
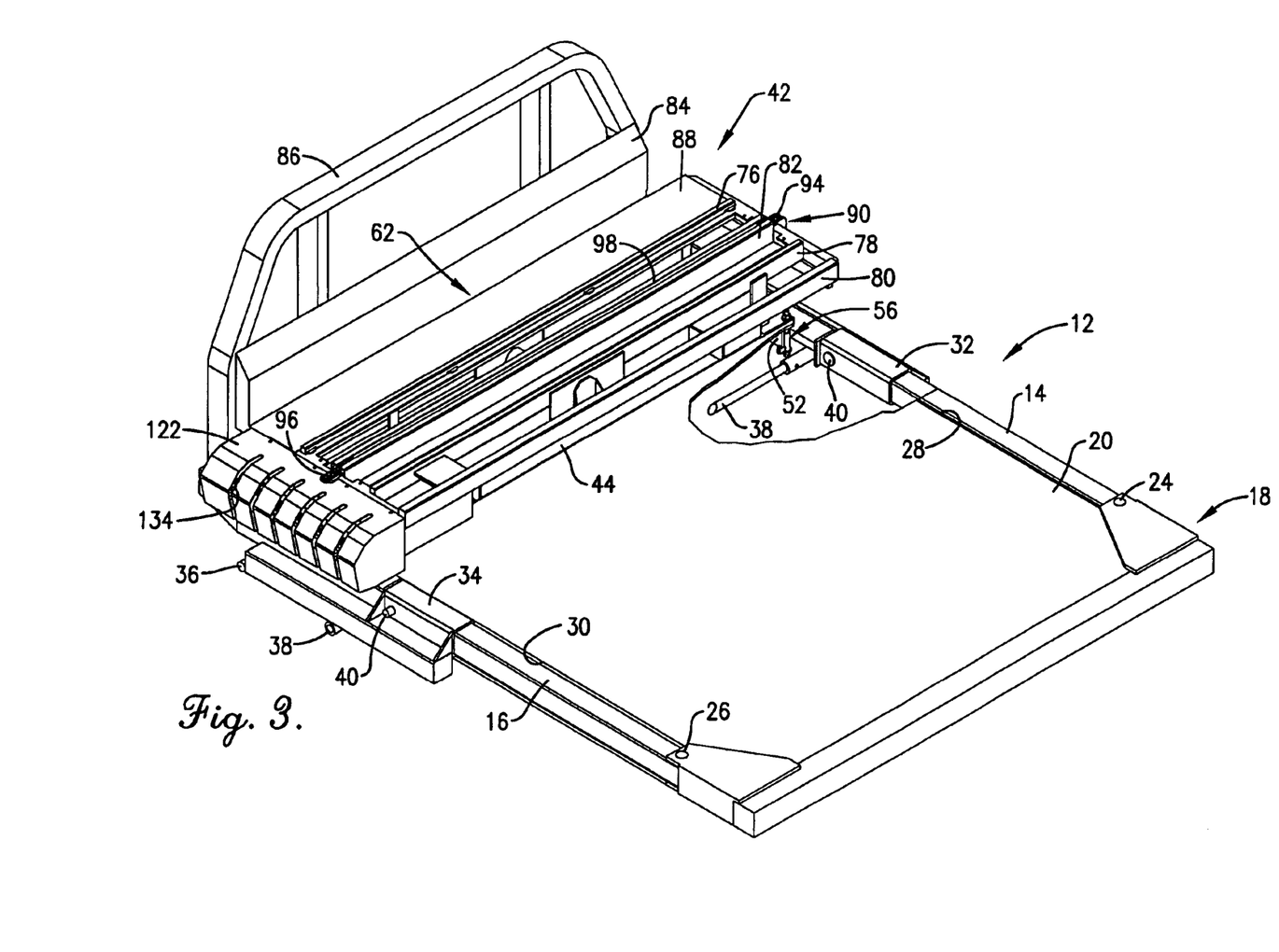
FIG. 3 is a top, rear isometric view of a bed assembly constructed in accordance with the principles of the present invention, parts being broken away to reveal details of construction.
Figure 5:
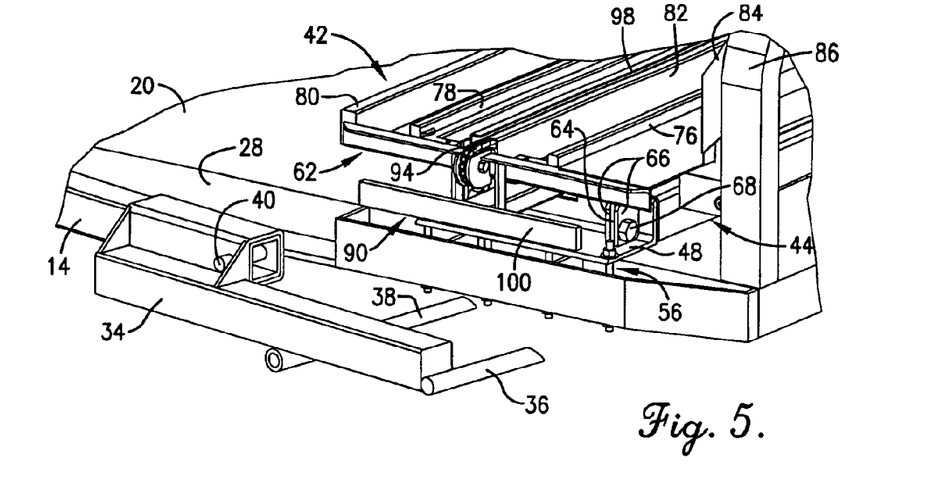
FIG. 5 is a fragmentary, right side front isometric view of the bed assembly showing the manner in which the bale-clamping tips of the lift arms are designed to be stowed neatly beneath the bed and the feeder when the lift arms are in their stowed positions.

Opposite side edges of bed 20 are provided with fore-and-aft extending, generally transversely L-shaped recesses 28 and 30 respectively that are configured to complementally receive arms 14 and 16 in a flat, stowed position as illustrated in FIG. 3 and also FIG. 1. FIG. 5 illustrates one of the recesses 28 with the arm 14 partially swung out laterally to reveal configuration details of recess 28. When arms 14 and 16 are in their stowed positions, they are substantially flush with the top surface of bed 20 so as to provide a clear open and unobstructed expanse for the top surface 20 that is not interfered with by arms 14, 16 or any of the other mechanism associated with retriever 18. When in their stowed positions, the upper surfaces of arms 14 and 16 serve as additional lateral extensions of the top surface of bed 20.

In one preferred form of the invention, the arms 14, 16 are provided with removable extensions 32 and 34 respectively that specifically adapt arms 14, 16 for handling a large square bale by squeezing it from its opposite ends. It will be appreciated by those skilled in the art, however, that extensions 32, 34 are not absolutely necessary, depending upon a number of factors, and in any event need not necessarily correspond in configuration to the particular extensions illustrated in the drawings. In the embodiment herein disclosed, each extension 32,34 is provided with a pair of fore-and-aft spaced, laterally projecting prongs 36 and 38 that are offset a short distance below the longitudinal axis of each of the arms. Prongs 36 and 38 are thus in position to pass under bed 20 into a clearing relationship therewith when arms 14, 16 are in their stowed positions, all as illustrated and exemplified in FIGS. 3 and 5. It will be understood that prong 36 is disposed for impaling the corresponding end of a large bale generally at the center thereof as illustrated in FIG. 2 when a retrieving operation is in process, while the other prong 38 is disposed to butt up against the front face of the bale during the retrieval process. This keeps the bale under the firm control of arms 14 and 16 at all times during the retrieval process. If desired, extensions 32, 34 can be made removably attachable to arms 14 and 16 such as through the use of a sleeve-like construction and a selectively insertable and removable locking pin 40 visible in FIGS. 3 and 5.

Bed assembly 12 also includes a square bale feeder broadly denoted by the numeral 42. In a preferred embodiment, feeder 42 extends transversely of the path of travel of vehicle 10 and of the longitudinal axis of bed 20 and is positioned at the front end of bed 20 so as to leave a large open expanse of bed 20 that is not occupied by feeder 42. Feeder 42 could, however, be arranged to extend fore-and-aft, or in any other direction. Preferably, feeder 42 is no wider than the width of a big square bale to be fed and may even be slightly narrower than such bale. Because bed 20 is several times longer than the width of a typical large square bale, the open and obstructed expanse of bed 20 between the rear extremity of feeder 42 and the rear end of bed 20 is substantial, leaving a large unobstructed surface area for hauling various items including, for example, other equipment during periods of non-use of feeder 42 and other bales during feeding or hauling operations. In its most preferred embodiment, feeder 42 is no longer than the width of bed 20 so as to avoid projecting laterally outwardly beyond the opposite sides thereof. It will be noted also that feeder 42 is of relatively low profile, presenting no tall structures that could present overhead clearance problems during feeding operations and at other times as well. In the alternative, feeder 42 could be disposed in a recessed condition so that the top surface of feeder 42 is substantially flush with the top surface of bed 20.

In one preferred embodiment of the invention, feeder 42 is designed as a retro-fit attachment to an existing bed assembly such as that disclosed in the '325 patent. Thus, although the disclosed embodiment contemplates feeder 42 as being detachably secured to bed 20, the feeder could comprise a more permanent part of an original equipment bed assembly and thus be affixed to the bed or the chassis of the vehicle using means other than releasable fasteners.

As illustrated in several of the figures, feeder 42 includes a base 44 of generally rectangular configuration when viewed in plan and consisting of a number of welded-together frame members that present an open framework-type of construction for base 44. Base 44 has a pair of mounting flanges 46 and 48 at opposite ends thereof that slightly overhang and project outwardly beyond the top surface of bed 20 and beyond upright structural side members 50 and 52 of bed 20 as illustrated particularly in FIG. 9. Holes 54 in flanges 46, 48 (FIG. 4) are located outboard of side members 50, 52 for cooperating with suitable fasteners 56 in securing base 44 to bed 20. In the illustrated embodiment fasteners 56 comprise bolt assemblies, each of which includes a sleeve 58 provided with a retaining hook 60 that fits under the bottom edge of the corresponding side member 50 or 52 to thus capture the member and securely retain base 24 in place when the bolt assembly is tightened.

Figure 13:
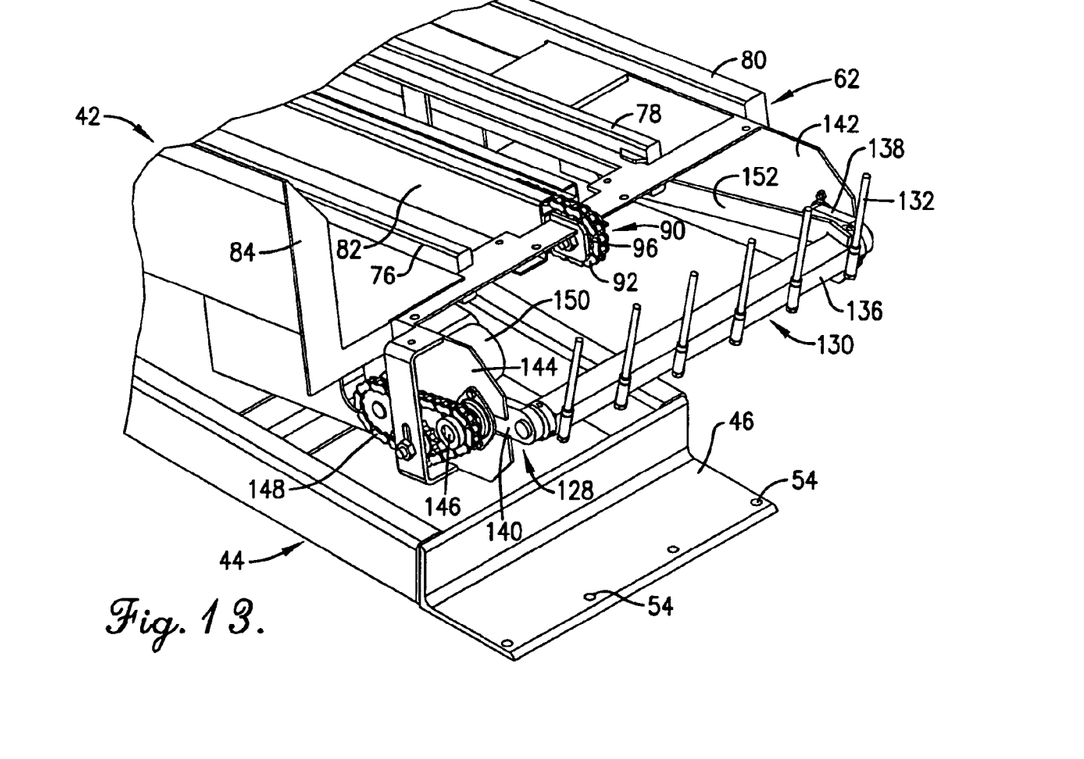
FIG. 13 is a fragmentary, front isometric view of the discharge end of the feeder with the discharge station thereof removed to reveal details of construction of the separating fork at that location.

In addition to base 44, feeder 42 includes a ramp broadly denoted by the numeral 62. Ramp 62 is mounted on frame 44 for selective positioning in either a lowered horizontal position as illustrated, for example, in FIGS. 1, 2 and 3, or a raised, upwardly inclined, feeding position illustrated for example in FIGS. 4, 9 and 13. Like frame 44, ramp 62 has a frame-like rectangular configuration as viewed in plan consisting of a number of structural members that are rigidly interconnected to provide a rigid overall structure. Ramp 62 is slightly longer and wider than frame 44 and directly overlies the latter in registered relationship therewith. A pair of mounting lugs 64 (only one being shown-see FIGS. 5 and 9) project downwardly from the non-discharge end of ramp 42 into receiving relationship between respective pairs of upstanding ears 66 on flange 48 of base 44. Pivot bolts 68 pivotally interconnect lugs 64 and ears 66 to render ramp 62 vertically swingable during movement between its raised and lowered positions. A hydraulic cylinder 70 connected between a cross member 72 on base 44 and a structural member 74 on ramp 62 provides the power for effecting such manipulation of ramp 62.

Ramp 62 has three laterally spaced apart and longitudinally extending rails 76, 78 and 80 that underlie and slidingly support a bale during feeding operations. In addition to rails 76–80, ramp 62 is also provided with a central, tube-like member 82 located between rails 76 and 78 that provides underlying support for the bale and also serves to house conveyor mechanism as described below. Although the areas between rails 76–80 and tube member 82 are illustrated in the drawings as being open spaces, such is for illustrative purposes only, as cover plates have been removed to show details of construction. Such shields or plates overlie the open spaces while allowing the upper extremities of rails 76, 78 and 80 and the upper extremity of tube member 82 to project upwardly therefrom to slidingly engage the bottom of the bale. An upstanding, relatively short front wall 84 on ramp 62 is spaced forwardly from rail 86 to serve as a guide wall along the front side edge of ramp 62 to contain the bale. Front wall 84 also keeps the bale from engaging or being interfered with by the upstanding "headache rack" 86 immediately behind the cab of vehicle 10 and fixed to bed 20 as is typical of such truck beds. A horizontal panel or cover 88 extends between the lower extremity of wall 84 and the rail 76 to cover the otherwise open space of ramp 62 at that location.

Ramp 62 is provided with conveying mechanism broadly denoted by the numeral 90 for advancing a bale along the length of ramp 62 toward the discharge end thereof which, in the illustrated embodiment, is the left end of ramp 62 as viewed from the rear of the vehicle, such discharge end being the elevated end when ramp 62 is in its raised position. Among other things, conveying mechanism 90 includes an endless chain 92 extending longitudinally of ramp 62 in association with tube member 82. Chain 92 is entrained at its opposite ends around a pair of sprockets 94 and 96 (see FIGS. 3 and 13 for sprocket 96) to present upper and lower runs of the chain 92. The upper run of chain 92 passes through or above tubular member 82, while the lower run passes below such member. A longitudinal slot 98 for a purpose yet-to-be described is located along the top extremity of tubular member 82 in overlying registration with the top run of chain 92.

Figure 4:
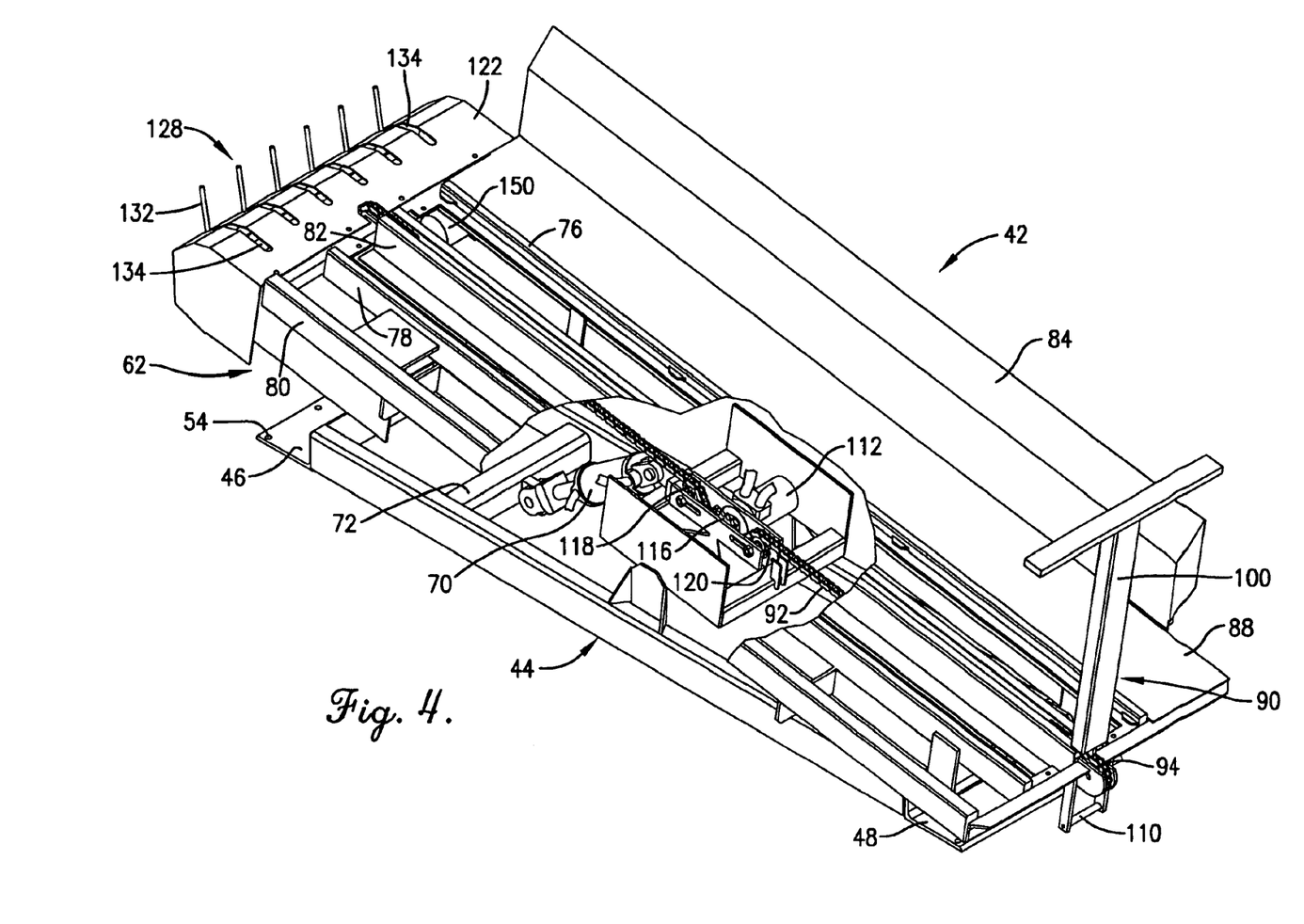
FIG. 4 is a top, rear isometric view of the feeder alone showing the ramp in its raised position, portions of the ramp being broken away to reveal details of construction.
Figure 9:
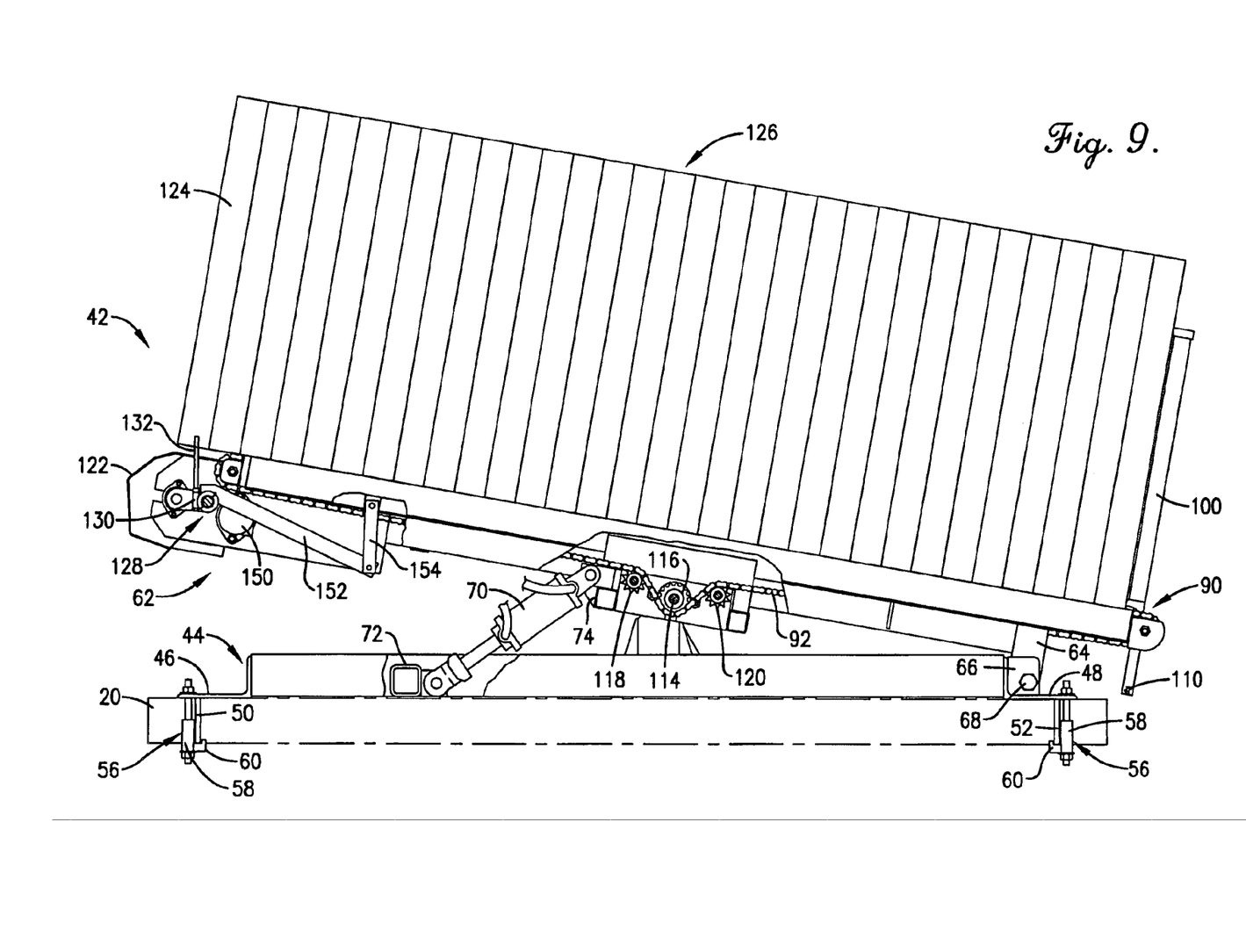
FIG. 9 is a side elevational view of the feeder with its ramp raised and a bale in position to be discharged by the feeder, parts being broken away to reveal details of construction.

Conveying mechanism 90 also includes a generally T-shaped pusher 100 secured to chain 92 for use in engaging the trailing or rear end of a bale and thus pushing the bale toward the discharge end of ramp 62 when conveyor chain 92 is actuated. In FIGS. 4 and 9, for example, pusher 100 is illustrated in an upstanding operating position which is maintained by pusher 100 at all of its positions along the top of ramp 62. However, pusher 100 is also selectively retractable down into a stored and protected position during periods of non-use and loading of a bale onto feeder 42.

In this respect, it will be noted from FIGS. 6–8 and 12 that pusher 100 is attached to chain 92 via a mounting foot 102 at the bottom of the main body of pusher 100. Foot 102 is connected to a pair of upstanding lugs 104 on chain 92 via a transverse pivot 106, thus pivotally securing pusher 100 to chain 92 for swinging movement relative thereto in a longitudinal, fore-and-aft direction. Slot 98 in tube member 82 provides clearance for lugs 104 and foot 102 all along the top run of chain 92. Rollers 106 on chain 92 (FIG. 12) are supported from beneath by longitudinally extending angle bars 108 on the inside surfaces of tube member 82 along the top run of chain 92.

Figure 6:
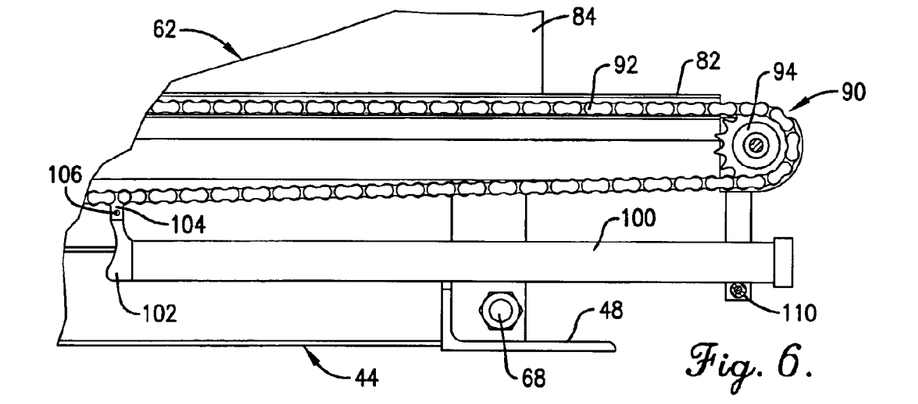
FIG. 6 is a fragmentary elevational view of one end of the conveyor mechanism associated with the feeder, the pusher component of the feeder being illustrated in a retracted and stowed position.
Figure 7:
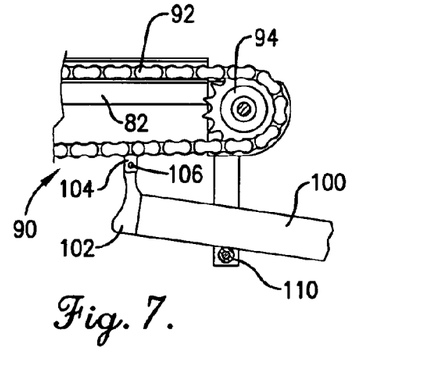
FIG. 7 is a fragmentary elevational view similar to FIG. 6 but illustrating the pusher partly deployed as the conveyor mechanism commences operation.
Figure 8:
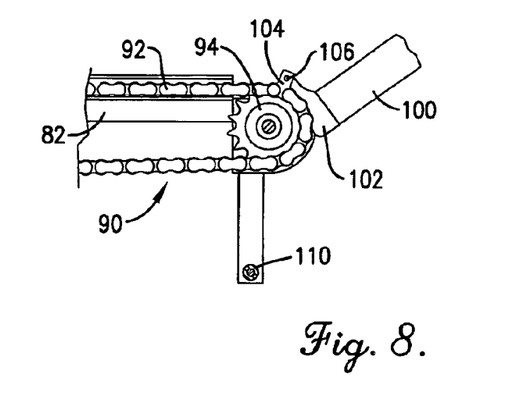
FIG. 8 is another fragmentary side elevational view of the conveyor mechanism similar to FIGS. 6 and 7 but showing the pusher fully deployed.

When pusher 100 is in its upright operating position along the top run of chain 92, a heel portion of foot 102 bears against chain 92 at a point a short distance behind pivot 106, (as shown for example in FIG. 8) so that, although pusher 100 is pivotally secured to chain 92, pusher 100 cannot be pushed over backwards about pivot 106 during engagement with a bale. However, pusher 100 is free to pivot forwardly about pivot 106; thus, when lugs 104 are positioned along the lower run of chain 92 as illustrated in FIGS. 6 and 7, for example, pusher 100 is free to swing forwardly and assume a horizontal, stowed position, aided by a transverse guide bar 110 spaced below sprocket 94 in the path of travel of pusher 100 as it moves around the corresponding end of ramp 62. Thus, guide bar 110 guides and holds pusher 100 into its horizontal stowed position of FIG. 6 as chain 92 is driven in a generally clockwise direction viewing that figure, and guide bar 110 maintains pusher 100 in a generally horizontally disposed condition until lugs 104 move past guide bar 110 and up around sprocket 94 as illustrated in FIGS. 7 and 8 when chain 92 is driven in a generally counterclockwise direction viewing those figures.

Conveying mechanism 90 further includes a reversible hydraulic motor 112 (FIGS. 4 and 9) for operating chain 92. Hydraulic motor 112 is secured to the ramp 62 on the underside thereof and has an output shaft 114 (FIG. 9) provided with a drive sprocket 116 maintained in driving engagement with the lower run of chain 92. A pair of idler sprockets 118 and 120 on opposite sides of drive sprocket 116 are mounted for adjustment toward and away from one another so as to provide a means of keeping chain 92 taut and in engagement with drive sprocket 116. As noted, chain 92 is looped over idler sprockets 118 and 120, while being looped under drive sprocket 116. Due to the fact that motor 112 is mounted on ramp 62 for movement therewith instead of on base 44, the length of chain 92 does not change as ramp 62 is raised and lowered.

At the discharge end of ramp 62, a discharge station or platform 122 is defined for receiving flakes of hay being advanced forwardly by conveying mechanism 90. Discharge platform 122 projects outwardly beyond the discharge end of chain 92 and presents an upper flat surface disposed to underlie and receive the endmost, leading flake of hay in a bale as illustrated by the flake 124 of bale 126 in FIG. 9. After extending generally horizontally for a distance to present the upper flat surface, platform 182 curves on down and around to present a generally rounded outermost end face as an extension of the upper flat surface.

To facilitate discharge of each flake from the platform 122, a separator broadly denoted by the numeral 128 is provided in association with platform 122. Separator 128 comprises a fork 130 having a series of prongs 132 that are adapted to engage the endmost flake 124 from the bottom while it overlies platform 122 and to then project the flake outwardly off platform 122 and onto the ground. Prongs 132 are designed to operate within slots 134 inplatform 122 so as to project upwardly into engagement with the flake 124 at the beginning of a feed stroke, then sweep forwardly and outwardly through slots 134 as the flake is flung outwardly, and to then retract back through slots 134 and into a protected position beneath platform 122 at the completion of their stroke.

Fork 130 includes a common cross bar 136 (FIG. 13) to which all of the prongs 132 are secured. Cross bar 136 is rotatably supported at its opposite ends by a pair of cranks 138 and 140 that rotate through complete 360° operating cycles during actuation of separator 128. Crank 138 is rotatably supported by an extension member 142 on the rear side of ramp 62, while crank 140 is rotatably supported by an extension member 144 on the front side of ramp 62. In addition, crank 140 has an input shaft 146 fixed thereto that is driven by a chain and sprocket assembly 148 also carried by the extension member 144. Chain and sprocket assembly 148 is operated by a hydraulic motor 150 on the extension member 144. A control arm 152 is fixed to cross bar 136 of fork 130 but is pivotally attached to the frame structure of ramp 62 via a link 154 (FIG. 9) so that prongs 132 are always maintained in an essentially upwardly projecting attitude throughout their full 360° of travel about the axis of rotation of cranks 138 and 140. Thus, slots 134 are useful in effectively stripping the prongs 132 out of the flakes as the prongs move through their penetrating, feeding and retracting motions. This type of action is illustrated, for example, in FIGS. 9, 10 and 11.

Figure 14:
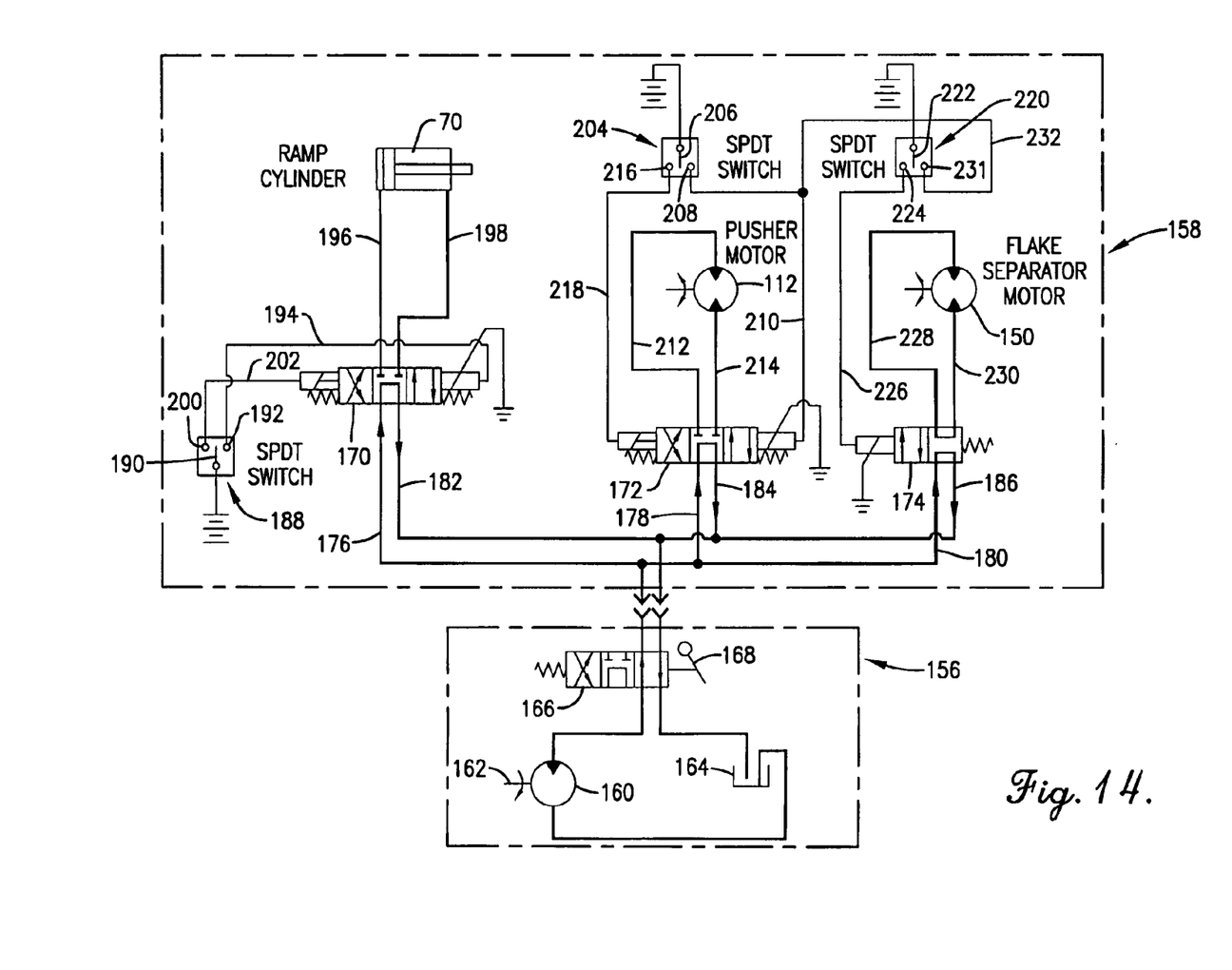
FIG. 14 is a schematic diagram of the electro-hydraulic system for controlling and operating the bed assembly and feeder thereof.

FIG. 14 is a schematic diagram of an electro-hydraulic control system for feeder 42. A separate control system, not illustrated herein, is provided on the vehicle 10 for operating the bale retriever 18. As shown in FIG. 14, the items designated broadly by the numeral 156 comprise components normally associated with a standard hydraulic supply system on a farm vehicle such as the vehicle 10. On the other hand, components designated broadly by the numeral 158 comprise components that are associated with feeder 42 and that are operably coupled with the vehicle-mounted supply system 156.

Supply system 156 includes a pump 160 driven by an output shaft 162 from the engine of vehicle 10. Pump 160 is operable to receive hydraulic fluid from a reservoir 164 for delivery under pressure to the components 158, depending upon the position of a three-position, manually actuated selector valve 166. Depending upon the position of a control handle 168, selector valve 166 maybe in a supply position as illustrated in FIG. 14, a standby position shifted somewhat rightwardly from the illustrated position, or a reverse position shifted fully rightward from the FIG. 14 position.

In the illustrated supply position, selector valve 166 is operable to supply oil under pressure from reservoir 164 to the ramp cylinder 70, the pusher motor 112 and the flake separator motor 150 depending upon the positions of respective solenoid valves 170, 172 and 174 for those components. Oil from pump 160 is simultaneously available to all three solenoid valves 170–174 via hydraulic lines 176, 178 and 180, but if the valves are in their neutral positions as illustrated in FIG. 14, the oil merely circulates back to reservoir 164 via return lines 182, 184 and 186. A single pole double-throw switch 188 for ramp cylinder 70 is electrically connected to solenoid valve 170 for controlling the position thereof. When the switch element 190 is moved from its neutral position shown in FIG. 14 into engagement with a contact 192, an electrical circuit is completed along lead 194 to shift valve 170 leftwardly from its FIG. 14 position, thus establishing communication between supply line 176 and a line 196 to ramp cylinder 70 to extend the latter. Oil forced out of cylinder 70 during such extension communicates with return line 182 via a line 198. On the other hand, when switch element 190 is moved into engagement with a contact 200 thereof, a circuit is established via a lead 202 to shift solenoid valve 170 rightwardly from its FIG. 14 position. This communicates line 198 of ramp cylinder 70 with supply line 176, causing cylinder 70 to retract. Line 196 thus communicates with return line 182 to provide a means for fluid exhausting from cylinder 70 to be returned to reservoir 164.

Another single pole double throw switch 204 is utilized to control solenoid valve 172 for pusher motor 112. When the switch element 206 of switch 204 is moved out of its neutral position of FIG. 14 and into engagement with a contact 208, a circuit path is established via a lead 210 that shifts solenoid 172 leftwardly from its neutral position of FIG. 14 to communicate supply line 178 with a line 212 leading to pusher motor 112. This drives pusher motor 112 in a "forward" direction as oil is exhausted therefrom via a line 214 that establishes communication with a return line 184. On the other hand, when switch element 206 is moved into engagement with contact 216 of switch 206, a different circuit path is established via a lead 218 to shift solenoid valve 172 rightwardly from its neutral position of FIG. 14 so as to bring supply line 178 into communication with line 214 and return line 184 into communication with line 212. This causes pusher motor 112 to rotate in a "reverse" direction. Like solenoid 170, valve 172 is yieldably biased toward the neutral position.

Solenoid valve 174 for separator motor 150 is a two-position valve, as contrasted to the three-position solenoid valves 170 and 172. A single pole double throw switch 220 controls valve 174 and, in one preferred embodiment, is arranged to also provide a way of actuating pusher motor 112 in the forward direction as an alternative to the performance of that function by switch 204. When switch element 222 is moved into engagement with a contact 224 of switch 220, an electrical circuit is established via a lead 226 to cause valve 174 to shift rightwardly from its neutral position of FIG. 14. This communicates supply line 180 with line 228, causing separator motor 150 to be driven in the proper direction, during which time oil is exhausted to return line 186 via a line 230 from motor 150. When valve 174 is in its neutral position, oil is free to circulate in a closed loop through line 228, motor 150, line 230, and valve 174 so fork 130 can return by gravity to a retracted position.

If the operator so desires, he may operate pusher motor 112 in the forward mode using switch 220 by moving switch element 222 into engagement with a contact 231 of switch 22. This establishes a circuit path to solenoid 172 via a lead 232 and lead 210, causing solenoid 172 to be shifted leftwardly from its neutral position to drive pusher motor 112 in the forward direction. Solenoid 174 is yieldably biased to its neutral position of FIG. 14.

Operation

In use, the vehicle 10 and bed assembly 12 are available for general utility purposes around the ranch or farm when lift arms 14, 16 are stowed and feeder 42 is in its lowered position, both of such conditions being illustrated in FIGS. 1 and 3, for example. The large uncluttered area on top of bed 20 immediately behind feeder 42 provides ample space for hauling and transporting various items, and also renders the vehicle suitable for general transportation services, including city and highway travel.

To pick up, transport and feed a big square bale, lift arms 14, 16 are first spread from their stowed positions of FIG. 3 until prongs 36 and 38 clear bed 20. Of course, if extensions 34 are not already installed on arms 14, 16, the arms simply need to be raised up out of their stowed positions, but then extensions 32 and 34 will need to be installed on the outer gripping ends of the arms before proceeding further.

Assuming for the sake of this discussion, however, that extensions 32 and 34 are already on arms 14 and 16, after the arms have been spread apart to withdraw prongs 36 and 38, they are swung upwardly and rearwardly into the rearwardly projecting, bale retrieving position of FIG. 2. With the arms still spread apart, the vehicle 10 is backed toward the bale, here denoted by the numeral 234, with the bale positioned crosswise to the path of travel of the vehicle. Once the rearmost tips of arms 14, 16 are generally aligned with opposite ends of bale 234, arms 14, 16 may be swung toward one another to engage, squeeze and grip bale 234 by its opposite ends. Prongs 36 penetrate the ends of bale 234 at this time, while prongs 34 come into abutment against the front face of bale 234.

Thereupon, arms 14, 16 are actuated to lift bale 234 off the ground and up and over bed 20 through an arc of approximately 180°, inverting the bale and placing it on feeder 42. Preferably, ramp 62 is in its lowered position at this time to facilitate reception of the bale. If desired, a second bale designated by the numeral 236 and shown in phantom in FIG. 2 may also be retrieved and then carried against the previous bale on feeder 42 by arms 16 for transport to the feeding site. If no second bale is to be transported, arms 14, 16 are simply returned to their stowed positions after disengaging themselves from the bale on feeder 42.

During transport of the bale to the feeding site, it has been found advantageous to have pusher 100 positioned against the normally trailing end of the bale and to raise the ramp 62 into its operating position so that a condition substantially illustrated in FIG. 9 is presented. This helps stabilize the bale for transport.

Figure 10:
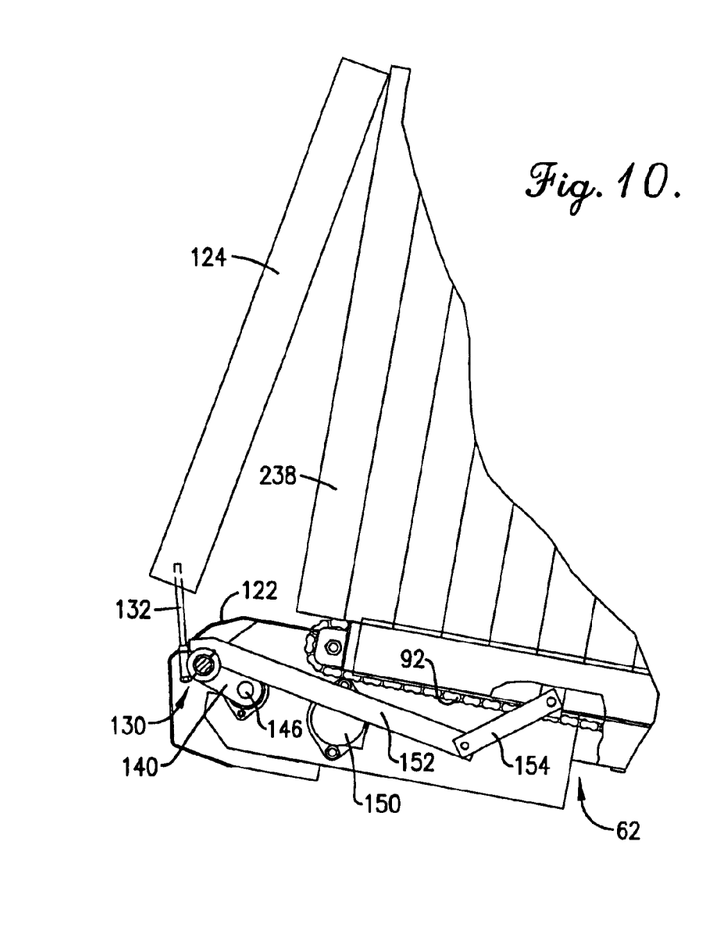
FIG. 10 is an enlarged fragmentary view of the discharge end of the feeder illustrating the way in which each successive flake of the bale is separated from the bale and discharged to the ground.
Figure 11:
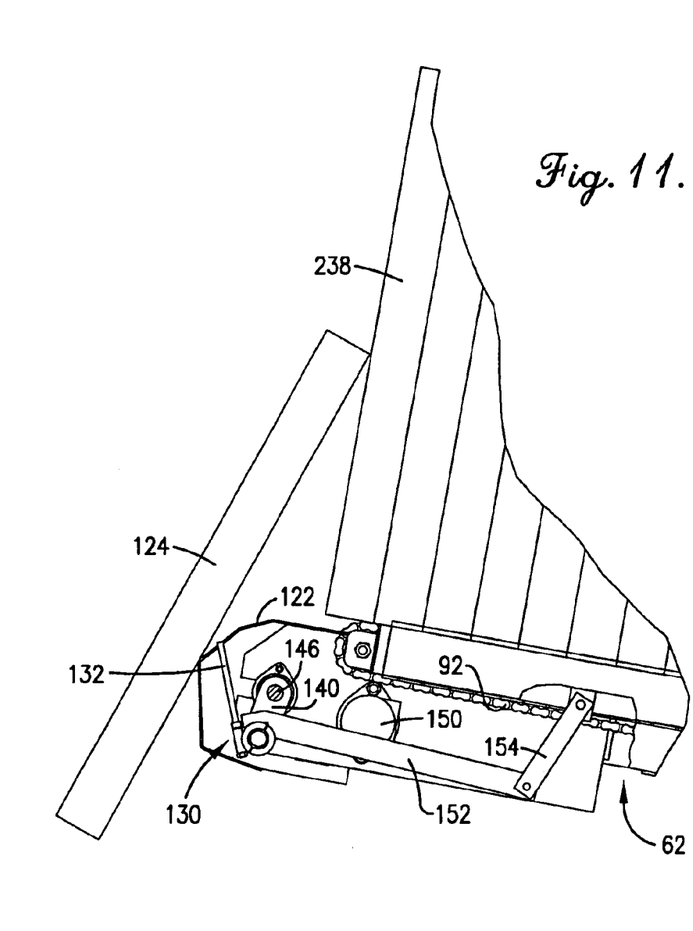
FIG. 11 is an enlarged fragmentary elevational view similar to FIG. 10 but illustrating the separation and discharge process at a slightly later point in the process.
Figure 12:
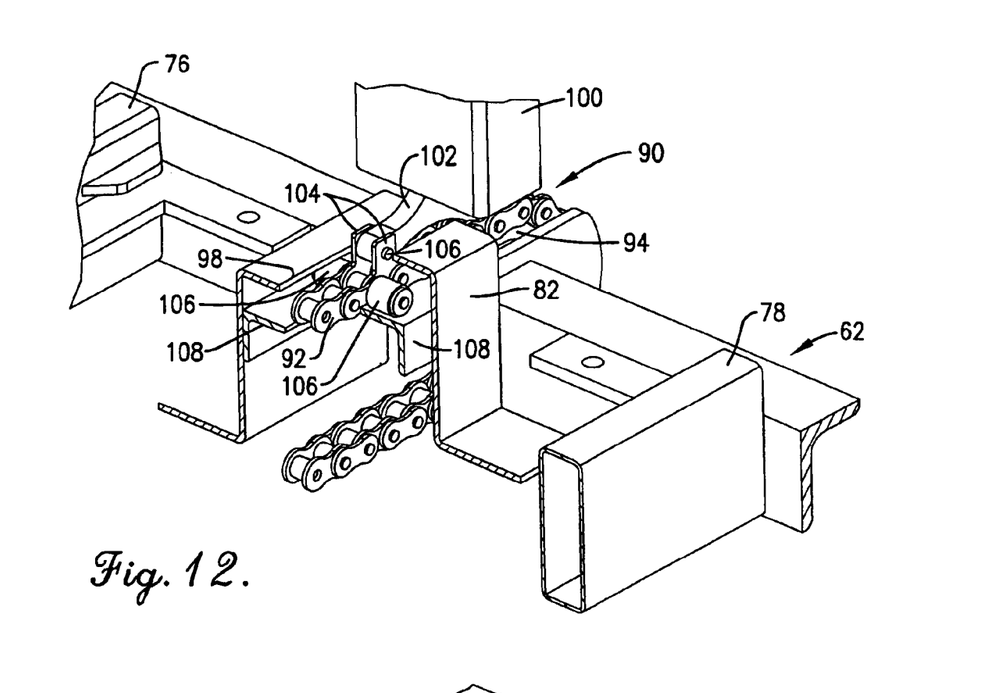
FIG. 12 is a fragmentary isometric view of the feeder illustrating details of construction of the pusher mounting arrangement.

After reaching the feeding site, the operator need only leave the cab so long as is necessary to clip and remove the strands of twine from around the bale. Pusher 100 is then actuated to shove bale 126 endwise until the leading flake 124 overlies discharge platform 122 as illustrated in FIG. 9. Stopping pusher 100 and energizing fork 130 then causes tines 132 to move up against and into the bottom of flake 124, and to then flip the flake outwardly off platform 122 as illustrated in FIG. 10. As fork 130 continues on around, tines 132 are retracted beneath platform 122 to be stripped out of flake 124 for discharge onto the ground. Actuation of fork 130 may then be terminated, or it may be allowed to continue cycling, although no further flakes will be discharged until the next leading flake 238 has been brought into position on platform 122 by pusher 100. Depending upon the number of flakes to be fed at any one location, the operator may choose to operate pusher 100 and fork 130 almost simultaneously, although in most instances it is likely that those two mechanisms will be operating sequentially of one another.

Tilting the bale so that it is fed "up hill" by pusher 100 helps assure that only one flake at a time is discharged from the feeder. Gravity helps keep the leading flake in the series in place against the next trailing flake such that a flake is discharged only when the force of gravity is overcome by the separating fork 130. Thus, the operator can fairly accurately control the amount of hay that is being distributed and its frequency.

Although the invention has been described above based upon the assumption that the feeder 42 will extend across the bed 20 and that a bale will be grasped by its opposite ends, it is within the principles of the present invention to have feeder 42 arranged fore-and-aft (or in any other direction) and to have retriever 18 correspondingly oriented. If feeder 42 is disposed to extend in a fore-and-aft direction and lift arms 14, 16 remain swingable fore-and-aft during retrieval operations, it is possible to approach a ground-supported bale by one of its ends. In that circumstance, arms 14, 16 would grasp the bale by its opposite sides, swing the bale overhead, and then place it on the feeder generally parallel to the path of travel of the vehicle. The bale could then be fed off the rear end of the vehicle.

Further, it is within the principles of the present invention for feeder 42 to be used by itself at a stationary work site and not as part of a mobile vehicle. Or, it may be mounted on a trailer, or wagon, or other vehicle that is not self-loading.

Alternative Embodiment

Figure 15:
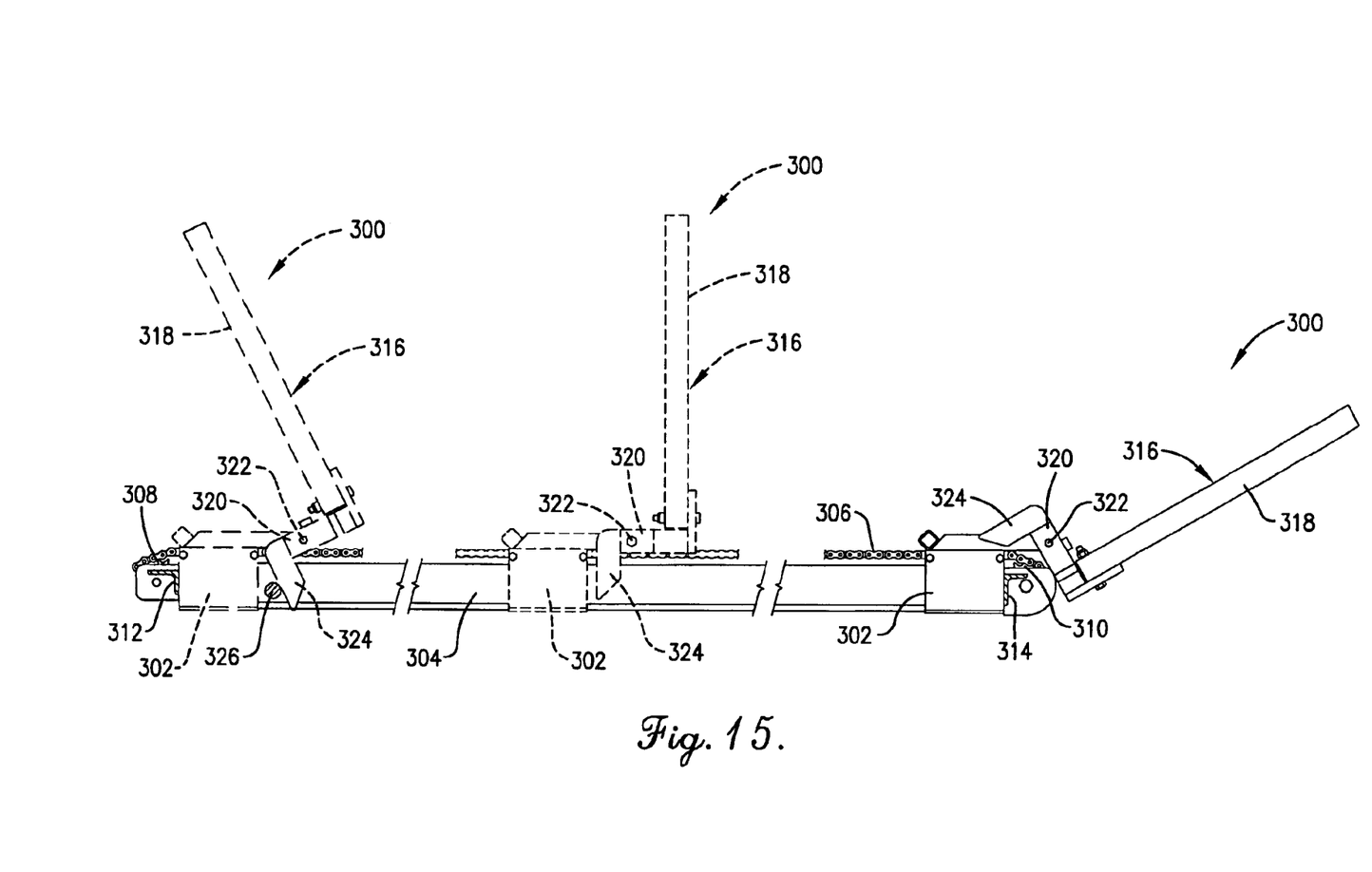
FIG. 15 is a schematic, fragmentary, side elevational view of a second embodiment of the pusher arrangement of the feeder.

FIG. 15 illustrates an alternative embodiment of the conveying mechanism for advancing the bale toward the discharge end of the feeder. In this embodiment conveying mechanism 300 includes a slider 302 that is slidably received on a transverse guide tube 304 extending the full length of the feeder. Slider 302 is moved back and forth along guide tube 304 by a chain 306 anchored to opposite ends of slider 302 and looped about sprockets 308 and 310 at opposite ends of tube 304. Crossbars 312 and 314 located slightly inboard of sprockets 304 and 310 serve as limit stops for slider 302 at opposite ends of its path of travel. Chain 306 is operably coupled with a hydraulic motor (not shown) in the same location as pusher motor 112 for the first embodiment.

Mechanism 300 further includes a generally L-shaped pusher 316 having a generally upwardly projecting back piece 318 and a base 320 at the lower end of back piece 318. Base 320 is pivotally attached to the trailing extremity of slider 302 by a transverse pivot 322 so that pusher 316 is free to pivot between the two extreme positions illustrated at opposite ends of the feeder. Base 320 has a downwardly projecting foot 324 at its forward end.

When pusher 316 is somewhere between the opposite ends of its path of travel as illustrated in one of the phantom conditions of FIG. 15, the trailing portion of base 320 rides upon chain 306 to hold pusher 316 against rocking back into its rearwardly inclined position which it assumes at the non-discharge end of the feeder. At the discharge end of the feeder, however, a transverse cam bar 326 is disposed in the path of travel of foot 324 so as to rock pusher 316 forwardly into a forwardly tilted attitude as slider 302 approaches and comes into engagement with cross bar 312. When chain 306 is reversed so that pusher 316 travels back toward its home position at the non-discharge end of the feeder, pusher 316 will probably remain in its forwardly tilted position until foot 324 engages cross bar 314, which causes pusher 316 to rock in a clockwise position into its rearwardly inclined position. Inasmuch as chain 306 curves around sprocket 320 and thus moves downwardly and away from base 320 at the non-discharge end of the feeder, pusher 316 is free to rock back in the indicated manner at that location.

It is contemplated that when no bale is present on the feeder, pusher 316 will be stored in its upright position.

Then, when a bale is to be loaded, pusher 316 is swung out to its rearwardly inclined position to avoid any interference with the bale and the lift arms during bale loading on the feeder. Thereupon, chain 306 is actuated in the forward direction, causing pusher 316 to move toward the discharge end of the feeder and into pushing engagement with the trailing end of the bale. Feeding of the bale then continues in the usual manner until the last flake remains to be fed, whereupon pusher 316 may be advanced one last increment of travel to cause it to tip forward and discharge the final flake.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. A feeder for square bales containing a series of successive, compacted flakes of crop material, said feeder comprising:

a ramp having a raised discharge end; and conveyor mechanism on the ramp for advancing a bale up the ramp toward said discharge end of the ramp, said ramp having a discharge station at said discharge end thereof in position for receiving and supporting successive flakes of the bale from said conveyor mechanism, said ramp further having a separating device associated with said station that is operable to engage flakes from beneath and project them off the station.

2. A feeder as claimed in claim 1, said conveyor mechanism and said separating device being actuatable and deactuatable independently of one another.

3. A feeder as claimed in claim 1, said separating device including a retracting fork movable through a path of travel in which tines of the fork project upwardly through slots in the station, sweep outwardly along the slots away from the conveyor mechanism, and then retract below the station.

4. A feeder as claimed in claim 1, said conveyor mechanism including a pusher disposed to project upwardly into position behind and in pushing engagement with the most trailing flake in the bale for advancing the bale.

5. A feeder as claimed in claim 1, said ramp being selectively lowerable into a generally horizontal position.

6. A feeder as claimed in claim 1, further including fasteners for attaching the feeder to a bed of a vehicle.

* * * * *